United States Patent [19]

Bonafous

[11] 4,108,199

[45] Aug. 22, 1978

[54] ISOLATING VALVES

[75] Inventor: Maurice Bonafous, Oloron, France

[73] Assignee: Applications Mechaniques et Robinetterie Industrielle, Paris, France

[21] Appl. No.: 665,766

[22] Filed: Mar. 11, 1976

[30] Foreign Application Priority Data

Mar. 11, 1975 [FR] France .................. 75 07569

[51] Int. Cl.² .............. F16K 1/226; F16K 1/44; F16K 24/02

[52] U.S. Cl. .............. 137/312; 137/614.11; 251/306

[58] Field of Search ........... 137/312, 609, 614.11; 251/305, 306

[56] References Cited

U.S. PATENT DOCUMENTS

| 660,995 | 10/1900 | Murray | 137/312 |
|---|---|---|---|
| 3,026,083 | 3/1962 | McLaren et al. | 251/306 X |
| 3,306,573 | 2/1967 | Trefil | 251/306 |
| 3,346,005 | 10/1967 | Hanssen | 251/306 X |
| 3,376,015 | 4/1968 | Forsman et al. | 251/306 |
| 3,532,321 | 10/1970 | Bowman et al. | 251/306 X |

FOREIGN PATENT DOCUMENTS

| 2,229,978 | 1/1974 | Fed. Rep. of Germany | 251/306 |
| 2,312,755 | 10/1974 | Fed. Rep. of Germany | 251/305 |
| 901,607 | 7/1962 | United Kingdom | 137/312 |

Primary Examiner—Gerald A. Michalsky
Attorney, Agent, or Firm—J. Harold Nissen

[57] ABSTRACT

A butterfly valve having two interconnected synchronously movable discs spaced apart axially in the direction fluid flow. In order to ensure that fluid is not retained between the discs when the valve is closed there is at least one drainage outlet which communicatingly connects the space between the discs and the valve exterior.

11 Claims, 5 Drawing Figures

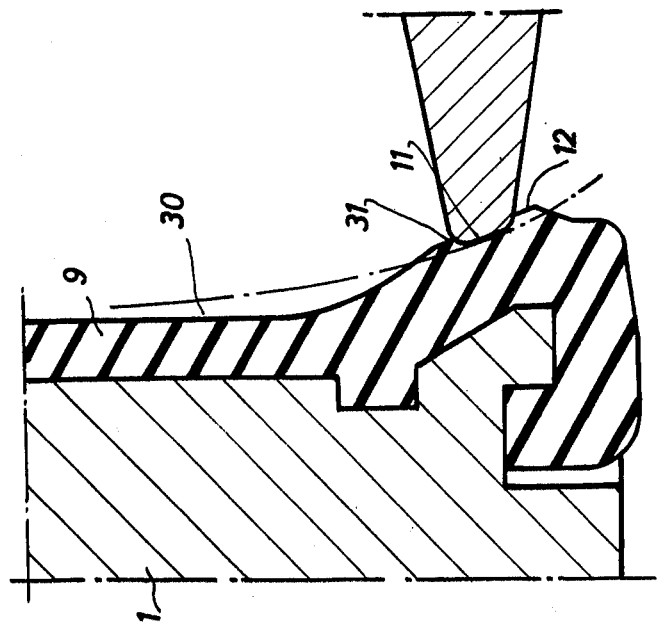
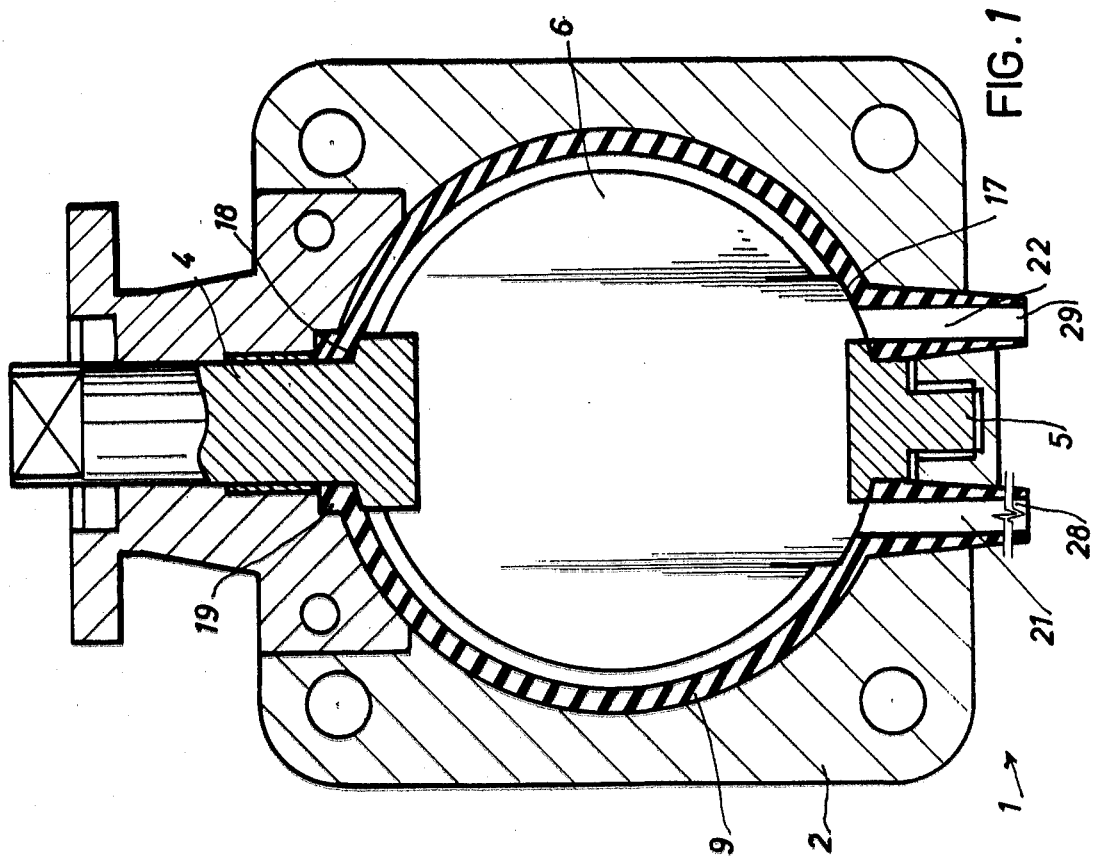

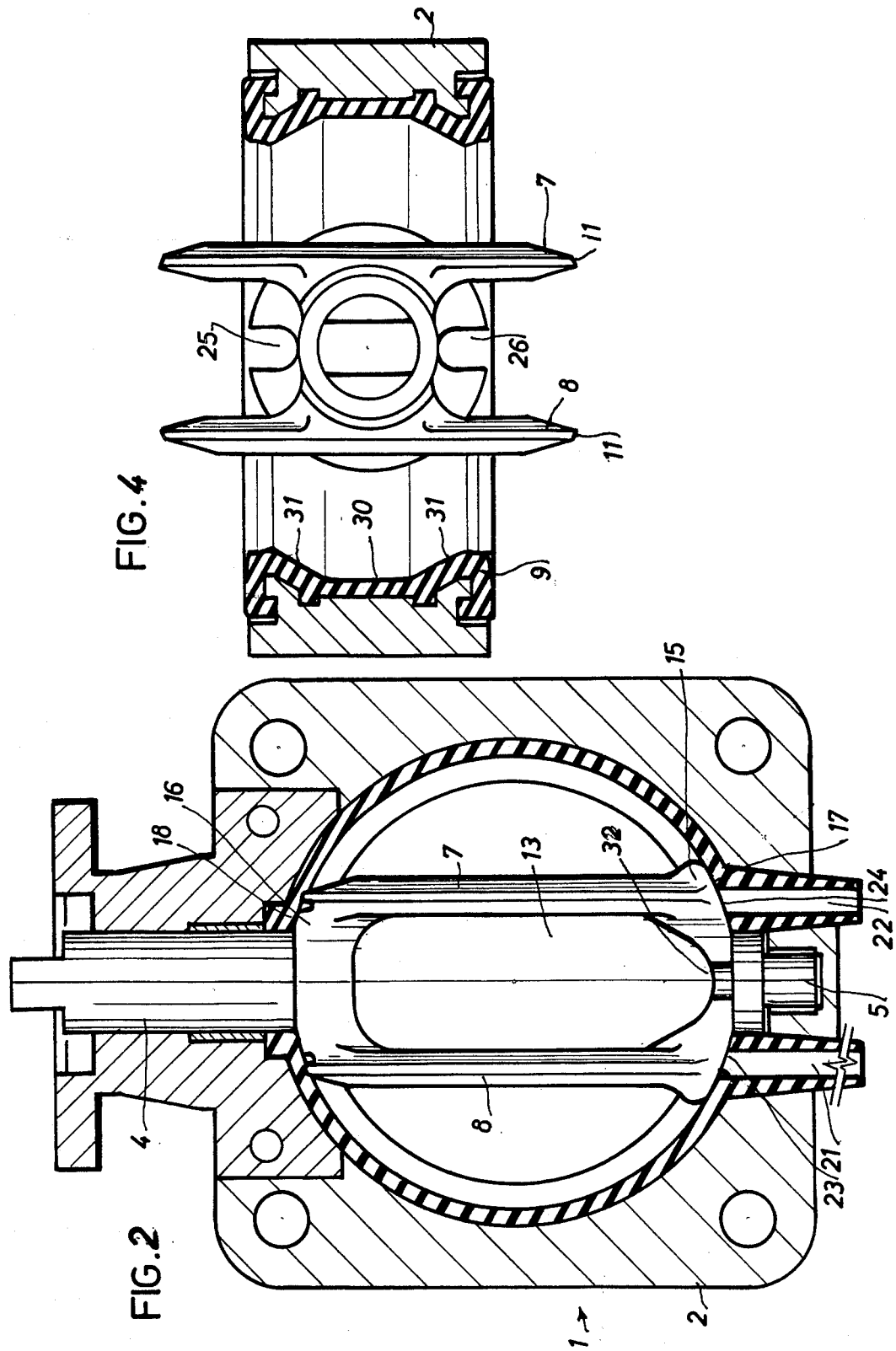

ISOLATING VALVES

The present invention relates to an isolating valve having a double safeguard, which may be used in particular in industrial installations in which the possible mixing of products, where there is no absolute seal of the valves, has such an incidence that a double safeguard is required. It is used in particular in a brewery, dairy and certain chemical industries. It is known for example that in the milk industry, the washing of circuits takes place by various detergents and it is necessary, during washing, that the circuits in which the milk is located, are in no danger of being polluted by an introduction of detergent, even in an infinitesimal quantity.

This double safeguard is generally obtained by means of two valves placed in series, between which is interposed a device for connection to the open air, consisting for example of a third valve.

Thus, any leakage in either of the valves placed in series, may flow through the device for connection to the open air, which is thus open, which thus eliminates any danger, even though this be a minimum danger, of mixing of the two products.

The invention therefore relates to an isolating valve having a double safeguard, replacing the three said valves. It achieves this result by using the general principle of conventional butterfly valves, i.e. valves whose upstream/downstream seal is obtained around the butterfly by an elastomeric and/or plastomeric gasket. Naturally, the invention may also apply to butterfly valves having a gasket on the butterfly and to butterfly valves having a gasket on the body or a gasket in the form of a flexible ring covering the entire inside of the body.

Consequently, the isolating valve having a double safeguard according to the invention consists essentially of a butterfly valve equipped with a double butterfly with connection to the open air, in the closed position of the valve by opening at least one orifice provided in the body and located between the two butterflies. This isolating valve which consequently has all the advantages of a conventional butterfly valve, may in particular be mounted between two sections of a pipe line, by flanges, owing to its low bulk.

According to one feature of the invention, the upstream/downstream seal of the isolating valve having a double safeguard is obtained by the action of the double butterfly on a flexible ring covering the entire inside of the body, in order to isolate the latter from the fluid conveyed.

According to one embodiment of the invention, the isolating valve having a double safeguard is composed essentially of a body, inside which is pivotally mounted, by means of a spindle or two journals, a double butterfly constituted by two parallel discs integral with said spindle and whereof the action on a flexible ring covering the inside of said body ensures a double upstream/downstream seal in the closed position of the valve, said body comprising two conduits, which, in the closed position of the valve, connect the space between the two said discs and said flexible ring to the outside, means being provided for closing off said conduits in the first opening stage and opening them in the last closing stage of the valve.

In this respect it will be noted that said means may be controlled by the inherent rotation of the spindle of the double butterfly or even by independent means.

According to another feature of the invention, in the vicinity of the passages of the spindle in the body, the double butterfly comprises a spherical portion bearing against a spherical portion (substantially at the diameter of the double butterflies) of complementary shape of the flexible ring, in order to ensure a first seal with respect to the outside. The spherical portion associated with the double butterfly thus comprises two diametrically opposed orifices or notches, whereas the two said conduits open into two diametrically opposed openings provided inside the spherical portion of the flexible ring. The arrangement of said orifices and said openings is such that, in the closed position of the valve, said openings are located in the region of said orifices such that the volume comprised between the two discs of the double butterfly and the flexible ring is connected to the open air and that, in the open or intermediate position, with the orifices and conduits offset, said conduits are closed by the spherical portion associated with the double butterfly.

One embodiment of the invention will be described hereafter, as a non-limiting example, with reference to the accompanying drawings in which:

FIGS. 1 and 2 show respectively in cross section, an isolating valve having a double safeguard, in the closed position (FIG. 1) and open position (FIG. 2);

FIG. 4 is a section at right-angles to the axis of the double butterfly of the isolating valve shown in FIGS. 1, 2 and 3, in the open position.

FIG. 5 is a partial section to an enlarged scale, making it possible to emphasise the shape of the flexible ring.

Figure 3:
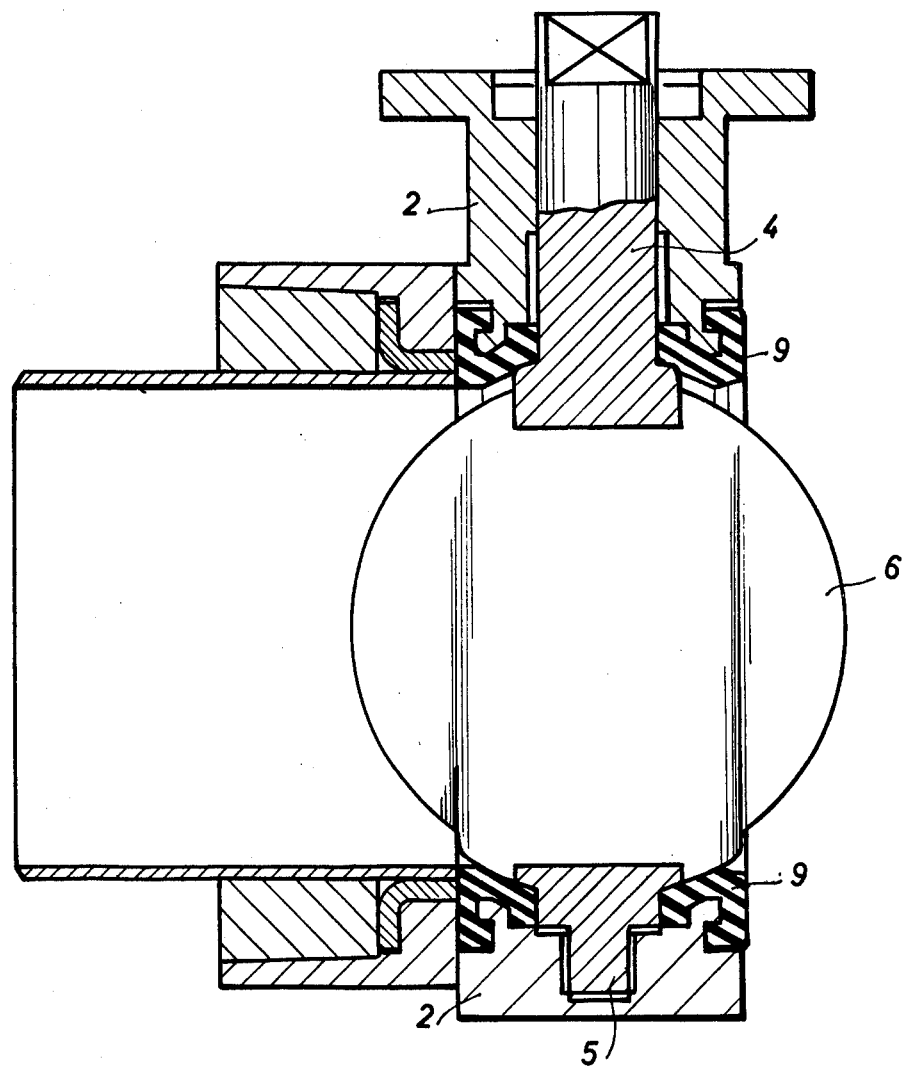
FIG. 3 is a longitudinal section of the valve shown in FIG. 1, in the open position.

As mentioned previously, the isolating valve having a double seal 1 comprises essentially a body 2, inside which is pivotally mounted, by means of a drive shaft 4 and coaxial journal 5, a double one-piece butterfly 6. This double butterfly is constituted (FIGS. 2 and 4) by two identical parallel discs 7 and 8 connected at the top and bottom respectively to the drive shaft 4 and journal 5. The inner surface of the body 2 is entirely covered by a flexible ring 9 which isolates the body 2 from the fluid conveyed and which serves to ensure the upstream/downstream seal of the valve 1. To this end, the edge 11 of the two discs has a spherical shape which bears, as shown in FIG. 5, which will be described in more detail hereafter, against a corresponding spherical shape 12 of the flexible ring 9.

Thus, in the closed position of the valve (FIG. 1), the two discs 7 and 8 ensure a double seal and with the flexible ring 9 define a sealed volume 13 with respect to the conduits placed upstream and downstream of the valve 1.

To ensure an external seal in the region where the spindles pass, in the region of its connection to the drive shaft 4 and journal 5, the double butterfly 6 comprises two spherical segments 15, 16 respectively of identical spherical diameter to the spherical diameter of the edges 11 of the discs 7 and 8. This spherical segment 15, 16 compresses the flexible ring 9 which at this point comprises a spherical shape or complementary segment 17, 18 and thus ensures a first seal.

Thus, this assembly advantageously ensures continuity of shape (spherical shape of the segments 15, 16, of the edge 11 of the two discs 7 and 8 and of the spherical shapes of the flexible ring 9) as well as consequently, continuity of flexibility, elasticity and compression rate around the double butterfly 6.

The ring 9 also comprises a flange 19 which bends back along the passage of the drive shaft 4 and thus ensures an ultimate sealing barrier.

In the example shown, the connection to the open air of the volume 13 in the closed position of the valve 1, is ensured by means of two conduits 21 and 22 provided in the body on either side of the passage of the journal 5 and which open inside the valve 1 by orifices 23, 24 provided in the flexible ring 9, inside the spherical shape 17. Conduit 21 in FIGS. 1 and 2 is shown broken to indicate that conduit 21 can be longer than conduit 22 in order to create hydrostatic unbalance between the two discs when the valve is closed. Similarly, the lower spherical segment 15 of the double butterfly 6 comprises two notches 25, 26 (FIG. 4) arranged symmetrically, which, in the closed position of the valve 1, are placed in the region of the orifices 23 and 24. Thus, during the opening of the valve 1, owing to its rotation about the shaft 4 and journal 5, the spherical segment 15 closes off the conduits 21 and 22, thus preventing any passage to the outside of the fluid circulating in the valve 1.

To facilitate their connection, for example to a washing and/or flushing circuit, the conduits 21 and 22 may be extended outside the valve 1 respectively by two tubes 28 and 29, which may be covered internally in a similar manner to the recesses 21 and 22 respectively, by two tubular extensions of the flexible ring 9.

It is obvious that in the embodiment afore-described, the safeguard of absolute isolation between the various fluids located upstream and downstream of the valve 1 is present. If, by way of an exception, there were a leakage in the region of the upstream/downstream seal provided by one of the discs 7, 8, the latter would flow through the conduits 21 and 22 to the outside.

Referring to FIG. 5, the flexible ring 9 which covers the inner surface of the body 2 and a part of the sides of the valve comprises an outer surface 30 of concave shape, whereof the lateral portions 31 have a spherical shape of spherical diameter slightly less than the spherical diameter of the edge of the discs 7, 8.

Thus, during closure of the valve 1, the discs 7, 8 bear on the lateral portions 31 of the flexible ring 9 (FIG. 5) which they compress sufficiently to ensure a seal.

To eliminate as much as possible retention of liquid upstream of the valve 1, due to the restriction of the section of passage in the region of the valve 1 after opening of the latter, in particular in the case of inclined pipework, the lower threshold 32 between the two discs may be chosen to be very low (as in the example shown in FIG. 2).

It will also be noted that owing to the slight volume defined by the discs 7, 8, a very small quantity of fluid will flow at the time of closure, through the conduits 21 and 22 which are thus uncovered, which constitutes a considerable advantage with respect to the conventional system having three valves.

Cleaning of the orifices 23, 24 or the pipes 21, 22 may take place in various ways.

It is thus possible to carry out low pressure flushing for example, which makes it possible to empty the volume 13 comprised between the two discs after closing the valve 1. Naturally, this flushing must take place at a pressure lower than that of the conduits located upstream and downstream of the valve 1, so as not to pollute the upstream or downstream fluid with the flushing fluid.

To ensure automatic emptying of the volume comprised between the two discs, after closure of the valve, it is also possible to extend one of the tubes 28, 29 in order to create hydrostatic unbalance.

The cleaning may finally be carried out by suction, by applying a certain vacuum to one of the two tubes 28, 29, in order to empty the volume 13 defined by the two discs 7, 8.

It will be noted that all the above-mentioned cleaning methods may be used selectively according to the requirements which may vary according to the industries or the working methods of each of these industries.

Thus, for example, in the case where the valve according to the invention is used in the milk industry, the valve 1 conveys milk in the normally open position.

To clean the circuit downstream of the valve 1, the latter will be closed and will ensure absolute isolation of the milk upstream and the cleaning liquid conveyed downstream.

In the case where it is desired to clean the valve itself, the milk is isolated by means of other valves located upstream and downstream.

In the cleaning phase, a series of basic solutions, a series of acidic solutions, then rinsing water are made to circulate successively in the pipe work adjoining the valve.

Cleaning generally lasts for a time sufficient for driving out all bacteria which, if they remained in large numbers in the valve or pipe work, would proliferate and pollute the milk at the time of a subsequent flow or storage.

During all the cleaning and rinsing stages, the valve 1 carries out a certain number of opening and closing manoeuvres in order to create locally, excess speeds and turbulence of the cleaning or rinsing liquid, turbulences which complete the chemical action of the fluid by mechanical action.

During these operations, the valve according to the invention will pass several times from "open" positions to "closed" positions and at the time of each manoeuvre there will be a cleaning of the orifices 23, 24 or conduits 21, 22 for connection to the open air, owing to the cleaning liquid and rinsing liquid which flow successively through these orifices or pipes.

Finally, it will be noted that the valve according to the invention may also be used on gas circuits which require absolute isolation between the upstream and downstream part, in the closed position of the valve.

In this case, manifolds are connected to a device for recovering the small quantity of gas comprised between the two discs. Naturally, in this case, there is no cleaning phase.

What is claimed is:

1. An isolating butterfly valve, comprising:
    a valve body having an upstream portion and a downstream portion, and orifice means between said upstream and downstream portions;
    a pair of joined discs axially spaced in the direction of fluid through-flow and housed within said body, means including spindles pivotally mounting said pair of discs for rotation in said valve body between a valve closed position closing off said upstream and said downstream portions and a valve open position opening said upstream and said downstream portions to each other;
    closing means separate from said spindles on said discs for closing said orifice means in the valve open position and opening said orifice means into said valve body in the valve closed position, said closing means being controlled by the rotation of said spindle, said orifice means being positioned between said discs in the valve closed position for opening the space between said discs to the exterior of the valve; and a flexible sleeve covering the interior of said valve body and together with said discs forming corresponding bearing surfaces and constituting a double upstream/downstream seal between said valve body and said discs in the valve closed position.

2. An isolating butterfly valve according to claim 1, in which the edge of each of the discs is of a spherical shape which bears on a corresponding spherical shape of the flexible sleeve along a diameter of the two discs.

3. An isolating butterfly valve according to claim 1, in which said flexible sleeve comprises an outer surface of concave shape and lateral portions having a spherical shape of spherical diameter slightly less than the spherical diameter of the edge of the discs.

4. The valve according to claim 1, wherein:
said orifice means includes two orifices, one on each side of said spindle; and
said closing means includes a spherical segment connecting each said discs, said segment closing each of said orifices upon rotation of said spindle to the valve open position and opening said orifice upon rotation of said spindle to the valve closed position.

5. An isolating butterfly valve according to claim 4, including a lower threshold, between said two discs, said threshold being sufficiently low so that no retention of liquid is possible.

6. An isolating butterfly valve according to claim 4, in which the inner surfaces of said orifices are covered by two tubular extensions of the flexible sleeve.

7. An isolating butterfly valve according to claim 4, in which said orifices are respectively extended by two tubes, one of these tubes having a length greater than the other, in order to create hydrostatic unbalance between the two discs when the valve is closed.

8. The valve according to claim 1, wherein:
said orifice means includes two orifices, one on each side of said spindle.

9. The valve according to claim 1, including:
a pair of spherical segments connecting said pair of discs together in spaced parallel relation, one of said segments being connected with said spindle, and one of said spherical segments including a low threshold portion and having diametrically disposed notches which in the closed position of the valve are placed in the region of the orifice means.

10. The valve according to claim 9, including:
a spindle for each of said segments for rotation of said parallel discs and said segments to close-off said valve and form a sealed volume between said upstream and said downstream portions, and said orifice means including orifices on opposite sides of said spindle providing access to the sealed volume in the valve closed position.

11. The valve according to claim 1, in which:
each of said pair of joined discs includes an upper and a lower spherical segment joining said spaced discs, said lower spherical segment having a pair of notches symmetrically arranged and in the closed position of said valve being in open communication with said orifice means;

said orifice means includes two diametrically opposed openings;

said flexible sleeve includes a spherical portion for each said discs complementary in shape to said upper and said lower spherical segment, in order to ensure a first seal towards the exterior of said valve, said flexible sleeve having said two diametrically opposed openings positioned on opposite sides of said spindle and each being located in a region of said lower spherical segment; and, the arrangement of said notches and said diametrically opposed openings being such that said openings are in communication with said notches in said valve closed position and the volume formed between said pair of discs and said flexible sleeve is connected to the exterior, and said notches and said diametrically opposed openings are offset from each other in said valve open position with said lower spherical segment closing said diametrically opposed openings.

* * * * *